United States Patent
Barron

(10) Patent No.: US 9,771,192 B2
(45) Date of Patent: Sep. 26, 2017

(54) METHOD AND DEVICE FOR PRODUCING TUBULAR BAGS

(71) Applicant: Robert Bosch GmbH, Stuttgart (DE)

(72) Inventor: Dan Barron, Schaffhausen (CH)

(73) Assignee: Robert Bosch GmbH, Stuttgart (DE)

( * ) Notice: Subject to any disclaimer, the term of this patent is extended or adjusted under 35 U.S.C. 154(b) by 3 days.

(21) Appl. No.: 14/776,570

(22) PCT Filed: Feb. 25, 2014

(86) PCT No.: PCT/EP2014/053593
§ 371 (c)(1),
(2) Date: Sep. 14, 2015

(87) PCT Pub. No.: WO2014/139788
PCT Pub. Date: Sep. 18, 2014

(65) Prior Publication Data
US 2016/0023823 A1 Jan. 28, 2016

(30) Foreign Application Priority Data

Mar. 12, 2013 (DE) .................. 10 2013 204 208

(51) Int. Cl.
*B65D 51/22* (2006.01)
*B65D 5/74* (2006.01)
(Continued)

(52) U.S. Cl.
CPC .......... *B65D 51/22* (2013.01); *B29C 66/4322* (2013.01); *B29C 66/47421* (2013.01);
(Continued)

(58) Field of Classification Search
None
See application file for complete search history.

(56) References Cited

U.S. PATENT DOCUMENTS

2007/0181522 A1* 8/2007 Davidson ........... B65D 47/0814
215/228
2013/0048638 A1* 2/2013 Fox .................... B65D 47/2031
220/284

(Continued)

FOREIGN PATENT DOCUMENTS

CN 102869580 1/2013
EP 1623931 2/2006
(Continued)

OTHER PUBLICATIONS

International Search Report for Application No. PCT/EP2014/053593 dated Jun. 12, 2014 (English Translation, 2 pages).

*Primary Examiner* — Monica Huson
(74) *Attorney, Agent, or Firm* — Michael Best & Friedrich LLP

(57) ABSTRACT

The invention relates to a method for producing tubular bags made from plastic film or from composite film having a plastic layer on the bag content side, having a self-cutting plastic closure attached to the tubular bag, consisting of a spout part having a fastening flange, a cutting body, which is movably guided in the spout part, and a screw cover having means for activating the cutting body. The film material (5) is supplied from a supply roll to a bag manufacturing machine and the plastic closure is sealed onto the film material in a spout region of a tubular bag. According to the invention, the film material (5) is thinned on the inside of the bag in a ring-shaped region, which is intended for cutting by the cutting body, by means of a thermal embossing process. The plastic closure is then positioned and sealed onto the film material such that the cutting organ embedded in the spout part can become effective in the thinned, ring-shaped region upon use thereof.

5 Claims, 4 Drawing Sheets

(51) Int. Cl.
*B29C 69/00* (2006.01)
*B65D 47/12* (2006.01)
B29C 65/00 (2006.01)
B29L 31/00 (2006.01)
B29C 65/02 (2006.01)

(52) U.S. Cl.
CPC ............ *B29C 69/001* (2013.01); *B65D 5/747* (2013.01); *B65D 47/12* (2013.01); *B29C 65/02* (2013.01); *B29C 66/0222* (2013.01); *B29C 66/112* (2013.01); *B29C 66/131* (2013.01); *B29C 66/53247* (2013.01); *B29C 66/71* (2013.01); *B29L 2031/7166* (2013.01); *B31B 2219/9054* (2013.01); *B65D 2251/009* (2013.01); *B65D 2251/0025* (2013.01); *B65D 2251/0028* (2013.01)

(56) References Cited

U.S. PATENT DOCUMENTS

| | | | | |
|---|---|---|---|---|
| 2014/0197199 | A1* | 7/2014 | Barron | B65D 51/243 |
| | | | | 222/83 |
| 2016/0023819 | A1* | 1/2016 | Maldonado | B65D 47/103 |
| | | | | 222/92 |

FOREIGN PATENT DOCUMENTS

| | | |
|---|---|---|
| JP | H09142456 | 6/1997 |
| WO | 9814317 | 4/1998 |
| WO | 2012152492 A1 | 11/2012 |

* cited by examiner

METHOD AND DEVICE FOR PRODUCING TUBULAR BAGS

BACKGROUND OF THE INVENTION

The invention relates to a method for producing tubular bags, a tubular bag produced in accordance with the method and a device for carrying out one of the method steps of the inventive method.

The invention particularly relates to a method for producing tubular bags made from plastic film or from composite film having a plastic layer on the bag content side, having a self-cutting plastic closure attached to the tubular bag, comprising a spout part having a fastening flange, a cutting body, which is movably guided in the spout part, and a screw cover having means for activating the cutting body, wherein the plastic film or composite film is supplied from a supply roll to a bag manufacturing machine and the plastic closure is in each case sealed onto the plastic film or the composite film in a spout region of a tubular bag. In such a method, a plastic film or a composite film is supplied from a supply roll to a tubular bag manufacturing machine, and separately supplied plastic closures are in each case sealed onto the plastic film or composite film in a spout region of a tubular bag.

In the case of flexible containers or, respectively, tubular bags of the aforementioned type, there is the requirement that the film material of the tubular bag has to be suitable for cutting with the cutting body of the plastic closure. At the same time, there is also the requirement that the tubular bag has to be resistant enough to withstand without damage being inadvertently dropped and the ensuing impact on the floor. These two requirements are partially antagonistic. The trouble-free cutting requires relatively brittle materials; whereas materials which have a relatively large elasticity are, however, the only materials which can ensure that the tubular bag will not burst upon impact with the floor or ground.

Film materials of flexible containers have greatly different resilience properties. This relates to the respective degree of possible elongation until breaking, i.e. the elongation at break. Film materials having less elasticity, such as, for example, polypropylene (PP), depending, of course, on the respective material thickness, can generally be cut with a small application of force. Brittle structures, such as aluminum or PET-SiOx, can likewise be easily cut. On the other hand, polyethylene (PE) has an elasticity (elongation at break) of over 800% and therefore presents difficulties in cutting. Polyethylene is however a necessity for break-proof flexible containers (in the case of being dropped as previously mentioned).

In addition, the resilience properties of the different film materials used is also dependent on the processing method used. The values achieved for the elongation at break are typically higher in the longitudinal direction (i.e. in the processing or cutting direction) than in the transverse direction (i.e. transverse to the processing or cutting direction).

It must furthermore be taken into consideration when dealing with composite films having layers of different materials that the material with the highest elasticity, i.e. precisely, for example, polyethylene, determines the effective elongation at break when a failure of the present composite occurs (in the cutting region).

Because tubular bags of the aforementioned type are used for the transport and storage of sensitive contents, such as, for example, foodstuffs, the integrity of the packaging must, of course, also be maintained until being opened by the consumer. It is therefore often the case that the flexible containers must also meet a number of other requirements in this regard.

Film materials are thus used which meet all of the aforementioned requirements to the greatest possible extent. These are then typically precisely those film materials or composite materials which, on the one hand, meet the requirements for strength, impermeability and hygiene and are however, on the other hand, also specifically designed to be easily or at least relatively easily cut. An example of the layered design of a commonly used composite film is depicted in FIG. 1. Overall, the ability of the cutting body disposed in the spout part to cut properly often continues, however, to be a problem. This can also generally be attributed to the fact that different stress ratios of the (remaining and not yet completely cut) film material, which usually can only be manipulated with a great deal of difficulty, are encountered during the course of the cutting operation. Further options for improving the capacity of the tubular bag to be cut open in a controlled manner are therefore sought. Several known options for improving the capacity of the tubular bag to be cut open consist of weakening the layered structure in the region of the cutting zone in a targeted manner, for example by means of laser scribing or by means of other partial perforations applied beforehand.

SUMMARY OF THE INVENTION

It is therefore the aim of the invention to specify a method for producing tubular bags made from plastic film or from composite film having a plastic layer on the bag content side, with which method improved and reliably reproducible features controlling the capacity of the tubular bag to be cut open can be achieved in a simple manner.

The aim is met by virtue of the fact that the plastic film or the composite film is thinned on the inside of the bag in a ring-shaped region, which is intended for cutting by the cutting body, by means of a thermal embossing process and by virtue of the fact that the plastic closure is subsequently positioned and sealed onto the film material such that the cutting body embedded in the spout part can become effective in the thinned, ring-shaped region upon use thereof, i.e. upon opening the tubular bag by rotating the screw cover.

One of the main advantages is, of course, that thermal embossing processes, which are known per se, can be easily integrated into the manufacturing process implemented with a tubular bag manufacturing machine. A preferred thermal embossing process is then the ultrasonic embossing process. In an ultrasonic embossing process, an anvil has the function of a punch and a sonotrode presses the material heated by ultrasound onto the punch so that said material is mechanically and thermally reshaped on the surface. After cooling the material, the embossing is completed. The method is also particularly suited to embossing thermoplastic films. Because the material is heated by means of ultrasonic vibrations, the application of force during ultrasonic embossing is significantly less than in mechanical methods. Further advantages include the short embossing times and the simplicity of the technology.

Because the material displaced out of the embossed recesses during the melting operation of the thermal embossing process does not easily clear out but generally accumulates in the proximity of the embossing location, a roll-in or press-in operation may be required to smooth out or reduce the irregularities, which have developed, after completion of the embossing process and prior to providing the plastic film or the composite film for the actual tubular bag manufacturing process. Said roll-in or press-in operation can take place in a subsequent rolling or pressing stage. Without such a stage, it must in fact be assumed that providing film which has already been embossed on supply rolls would lead to supply rolls that are unshapely large and for the most part hard to manage on account of irregularities and thickenings which are still present, in particular because the precision of the winding and unwinding and therefore also the guidance of the film web would be disturbed during further processing.

The method for producing tubular bags can therefore basically be designed such that a supply roll contains film material that has already been embossed and supplies the same to the tubular bag manufacturing machine. It can, however, also be that the supply roll contains film material that has not yet been embossed and that the thermal embossing process is first carried out in the tubular bag manufacturing machine itself. In the latter case, a subsequent rolling in or pressing in of the material accumulations incurred during the embossing process might then no longer be necessary.

In any case, a tubular bag made from plastic film or from a composite film having a plastic layer on the bag content side can be produced with the method according to the invention, in which the plastic film or the composite film is thinned on the inside of the bag in a ring-shaped region, which is intended for cutting by the cutting body. This thinning means a weakening of the film material, and said film material can therefore be more easily and reliably severed by the cutting body at this location. Because it is also additionally to be expected that the thermal embossing process causes additional local changes in the material properties of the plastic in the embossing region as a result of the heat effect, namely a local increase in the brittleness, this too causes an easier severability of the packaging material.

The process of thermal embossing is to be seen as one of the necessary procedural steps for producing a tubular bag according to the invention. It is thereby assumed that the remaining procedural steps for producing such a tubular bag should be sufficiently familiar to the person skilled in the art. Hence, they will not be explained below in greater detail.

According to the invention, a device which is particularly suited to the process of thermal embossing is used. This device comprises an anvil having a web elevated in a ring-like manner and having a substantially planar plateau region, wherein the web has a plurality of discharge channels, which are arranged on the interior side and on the exterior side thereof. Web, plateau region and discharge channels are thereby selected and disposed such that the embossing process can be carried out quickly, efficiently and in a trouble-free manner. Details to this regard can be extracted from the description below of the exemplary embodiment.

The disclosed method and the device for carrying out the procedural step comprising the use of the thermal embossing process for thinning the plastic film or the composite film on the inside of the bag in a ring-shaped region can, of course, be implemented not only with an ultrasonic embossing method. Other thermal embossing methods, for example, those with an electrically heated anvil can be implemented with an identical or similar device. The energy consumption used for heating may, however, then be higher. During ultrasonic embossing, the ultrasonic energy has to only be available at the point in time of the actual embossing process.

BRIEF DESCRIPTION OF THE DRAWINGS

The invention is subsequently described in detail using a preferred exemplary embodiment. In the drawings.

DETAILED DESCRIPTION

Figure 1:
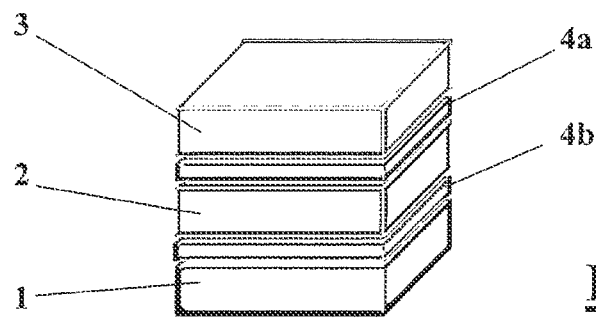
FIG. 1 shows the layer structure of a known composite film for producing tubular bags.

FIG. 1 shows the layer structure of a known composite film for producing tubular bags. An inner layer 1 consists of LLDPE, i.e. of a linear low-density polyethylene; a barrier layer 2 consists of aluminum/PET or SiOx, i.e. from aluminum metalized polyethylene terephthalate or silicon oxide; and an outer layer 3 consists of PP, i.e. polypropylene. LLDPE as well as PET and PP are thermoplastics and particularly LLDPE and PP have high elongation at break values. Adhesive layers 4a, 4b are located between these layers.

Figure 2:
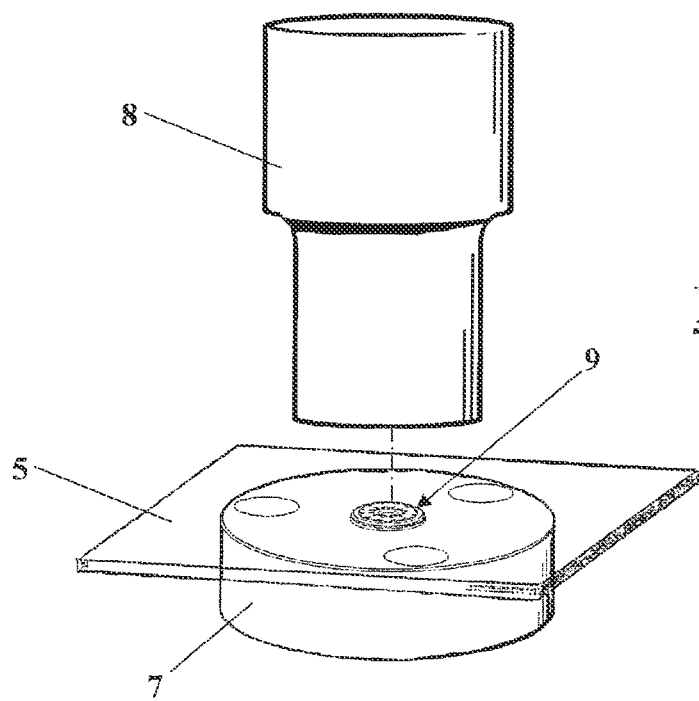
FIG. 2 shows the basic structure of an ultrasonic embossing device according to the invention.

FIG. 2 shows the basic structure of an ultrasonic embossing device according to the invention. The film material 5 for producing tubular bags 6 (see also FIG. 3) is guided between an anvil 7 and an ultrasonic tool 8, a so-called sonotrode, and namely in such a way that at least the layer of the film material 5 provided on the bag content side is a plastic or, respectively, thermoplastic layer and can come in contact with the anvil 7. The composite film depicted in FIG. 1 can, for example, be used as the film material. The anvil 7 has a web 8 which is elevated in a ring-like manner and constitutes the actual embossing form. The ultrasonic tool 8 is a sonotrode of a known embodiment. In order to carry out an individual embossing process, the film material 5, which is pulled between the anvil 7 and the ultrasonic tool 8, is temporarily held at the location at which a plastic closure 10 is to be sealed thereon. The ultrasonic tool 8 is then lowered under pressure onto the anvil 7, whereby the film material 5 is clamped between the web 9 and the ultrasonic tool. By activating the ultrasonic tool 8, at least the thermoplastic or, respectively, plastic layer of the film material 5 on the bag content side is heated and melted and displaced under the effect of the contact pressure. In this way, the embossing or the thinned ring-shaped region in the film material 5 develops.

Figure 3:
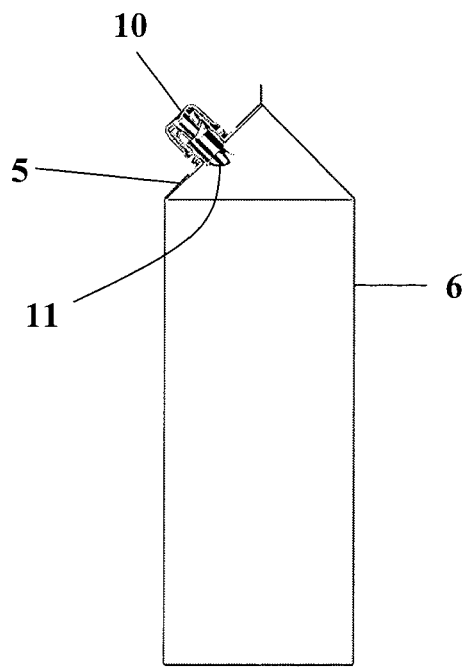
FIG. 3 shows a partial sectional drawing of a plastic closure on a tubular bag.

FIG. 3 shows a partial sectional drawing of a plastic closure 10 on a tubular bag 6. It should be made clear that this figure has only an exemplary character because the method is, of course, suited to a plurality of possible tubular bag shapes. FIG. 3, however, illustrates that the plastic closure 10 is always sealed onto the film material 5 of the tubular bag at a defined location in a spout region. The state in which the film material 5 has already been cut open by the cutting body 11, which is movably guided in the interior of the spout part, is also indicated in this figure. It can in fact be seen that a part of the cutting organ protrudes into the inside of the tubular bag 6.

Figure 4:
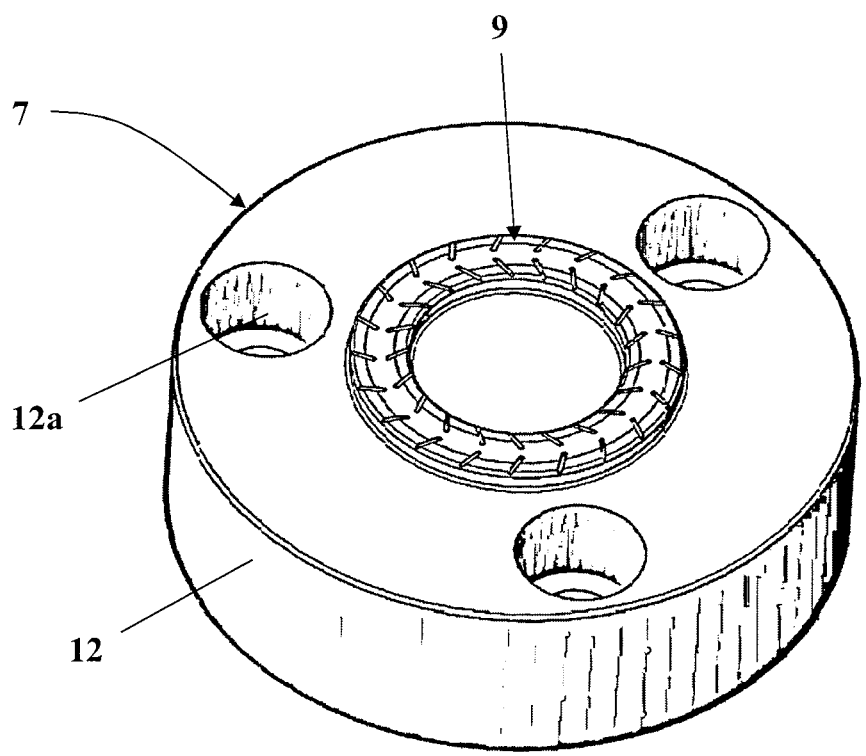
FIG. 4 shows an anvil of an ultrasonic embossing device having a ring-like web in a spatial depiction.

FIG. 4 shows the anvil 7 of an ultrasonic embossing device comprising the ring-like web 9 in a spatial depiction.

The anvil 7 comprises a base part 12 which has attachment recesses 12a. The web 9 that is elevated in a ring-like manner is centrally disposed on the base part 12. Said web 9 that is elevated in a ring-like manner is preferably integrally formed on the base part 12.

The base part 12 has the necessary size and strength to be able to withstand the forces exerted by the lowerable ultrasonic tool 8. The elevated web 9 is, of course, used to center the embossing force in the embossing region and said web also has a special surface profile, which is suited to abruptly and reliably displacing the melting plastic in the embossing region when using the thermal embossing method.

Figure 5:
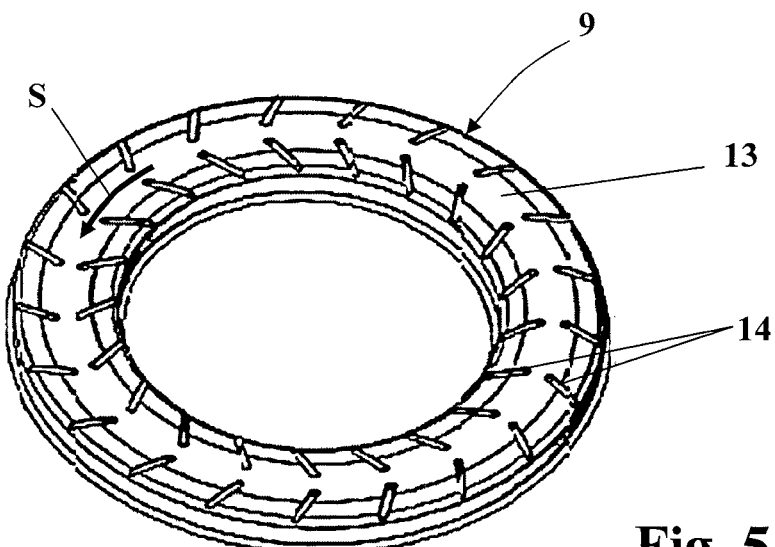
FIG. 5 shows the web from FIG. 4 in a spatial depiction.
Figure 6:
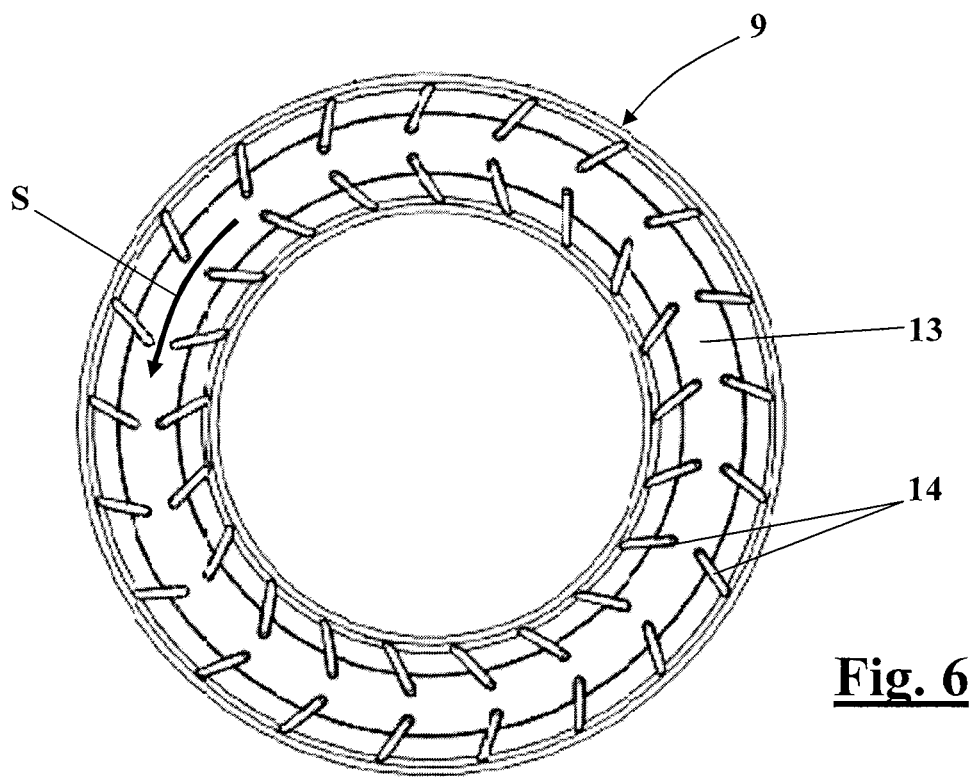
FIG. 6 shows the anvil from FIG. 4 in a top view and
FIG. 7 shows the basic arrangement of a rolling stage downstream of an ultrasonic embossing device.

FIGS. 5 and 6 show the web from FIG. 4 in greater detail in a spatial depiction and in a top view. It can be seen from the figures that the web 9 elevated in a ring-like manner has a substantially planar plateau region 13 in the center thereof, and that said web also has a plurality of discharge channels 14 that are disposed on the internal side and on the external side and in fact in such a way that they, on the one hand, extend from the plateau region 13 into a center region and, on the other hand, extend from the plateau region 13 into a peripheral region.

It can also be seen that the discharge channels 14 protrude on both sides into the plateau region 13 in a non-crossing fashion and that said discharge channels 14 are not connected to one another. Said discharge channels 14 are furthermore disposed in such a manner that they extend in pairs so as to incline backwards with respect to a cutting direction S of the cutting body, wherein said channels run out at least approximately from the center of the plateau region 13. The cutting direction S is the direction in which the cutting body of the plastic closure is guided when cutting through the film material.

The relatively wide plateau region 13 (with respect to the web 9 as a whole) is used, on the one hand, to prevent damage to the remaining structure of the film material 5; and, on the other hand, a certain tolerance range when aligning or placing the plastic closure on the film material is also to be created with said plateau region. As mentioned earlier, the discharge channels are dimensioned and disposed in such a way that the melted plastic is displaced as rapidly as possible out of the plateau region. The fact that the discharge channels are inclined backwards in relation to the cutting direction S is linked to the fact that the melted and displaced plastic tends to form material thickenings in exactly these regions when cooling down. Said discharge channels thus have the effect that the embossed film material 5 can better unfold in the region of the cutting edge when being cut open with the cutting body and thus contributes to the torque, which is exerted when opening or, respectively, cutting open said film material, not having to be unnecessarily increased. It has also been shown that undesired fiber formations, which often develop during the cutting process and can cause the film section to be cut out to remain hanging in an unfavorable manner over the intended opening, can be reduced in this way. The fiber formation is also reduced by virtue of the fact that the hot embossing changes the physical properties with respect to elasticity.

Experiments with different film material structures have shown that not only significantly smaller torques for opening or, respectively cutting open, the flexible containers can be achieved but also the success rates for a trouble-free opening of said containers are significantly increased with the inventive thermal embossing method for creating a thinned ring-shaped region and the associated weakening of the film material in the ring-shaped regions.

Figure 7:
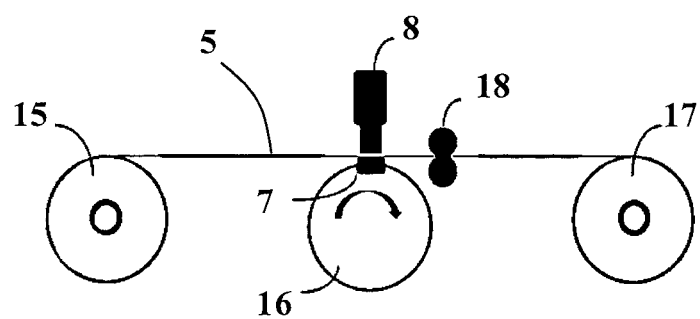

Finally, FIG. 7 shows the basic arrangement of a rolling stage downstream of an ultrasonic embossing device. As was mentioned earlier, such a device can be used to smooth out and/or reduce irregularities developed during the embossing process. It has been shown that the material displacements resulting in the outflow regions of the discharge channels can otherwise reach approximately twice the thickness of the film material, which, of course, is highly undesirable for the downstream supply roll processing because the uniform winding and unwinding of the film material is impaired and also leads to very many thicker rolls. Uniform and well controllable winding and unwinding of film material is very important in the manufacturing process of tubular bags because, inter alia, the locally precise positioning of the plastic closure would otherwise be impaired.

When using a rolling stage, the unembossed film material 5 is initially supplied by an unwinding device 15 to a thermal embossing device or an ultrasonic embossing device. The ultrasonic embossing device comprises an ultrasonic tool 8 and a rotary cylinder 16 which is disposed under said tool and on which one or a plurality of anvils 7 is disposed. The film material 5 is thereby pulled in a position-controlled manner between the ultrasonic tool 8 and the rotary cylinder or, respectively, the respective anvil lying below the ultrasonic tool 8 and wound onto a supply roll 17. A rolling stage comprising press rollers 18 is disposed immediately adjacent to the ultrasonic embossing device. The rolling stage is located in a region in which the film material that is still warm from the ultrasonic embossing process can be compressed to a desired thickness. The rolled film material 5 is subsequently rolled onto the supply roll 17 under a defined tensile stress.

It was already mentioned earlier that the thermal embossing process can be used either already in the pre-stage region, i.e. when providing film material for a tubular bag manufacturing machine or in the tubular bag manufacturing machine itself. The method for producing tubular bags can therefore basically be designed such that the supply roll, from which film material is supplied to the tubular bag manufacturing process, already contains embossed film material. It can, however, also be that the supply roll contains film material that has not yet been embossed and that the thermal embossing process is first carried out in the tubular bag manufacturing machine itself. In the latter case, a subsequent roll-in or press-in operation of the material accumulations incurred during the embossing process may however no longer be necessary because further processes for winding the film material onto a supply roller are, of course, unnecessary.

The invention claimed is:

1. A method for producing tubular bags (6) made from plastic film or from composite film having a plastic layer on a bag contact side, having a self-cutting plastic closure (10) attached to the tubular bag (6), comprising a spout part having a fastening flange, a cutting body (11), which is movably guided in the spout part, and a screw cover, wherein the plastic film or composite film is supplied from a supply roll (17) to a bag manufacturing machine and the plastic closure (10) is in each case sealed onto the plastic film or the composite film in a spout region of a tubular bag (6), the method comprising:

thinning the plastic film or the composite film on an inside of the bag in a ring-shaped region intended to be cut by the cutting body (11), by a thermal embossing process; and subsequently positioning and sealing the plastic closure (10) onto the plastic film or the composite film such that the cutting body (11) embedded in the spout part becomes effective in the thinned, ring-shaped region upon use thereof.

2. The method according to patent claim 1, characterized in that the thermal embossing process is an ultrasonic embossing process.

3. The method according to patent claim 1, characterized in that the plastic film or composite film is thinned in the ring-shaped region by the thermal embossing process beforehand and outside of the bag manufacturing machine and is subsequently provided on the supply roll (17).

4. The method according to patent claim 1, characterized in that the plastic film or the composite film is thinned in the ring-shaped region by the thermal embossing process within the bag manufacturing machine.

5. The method according to patent claim 3, characterized in that the plastic film or the composite film runs through a rolling or pressing stage immediately after the use of the thermal embossing process in order to smooth out or reduce irregularities and is subsequently provided on the supply roll (17).

\* \* \* \* \*